(No Model.) 2 Sheets—Sheet 1.
T. JOHNSON, A. HANSON & N. WHITELEY.
CHILD'S CARRIAGE.
No. 425,612. Patented Apr. 15, 1890.
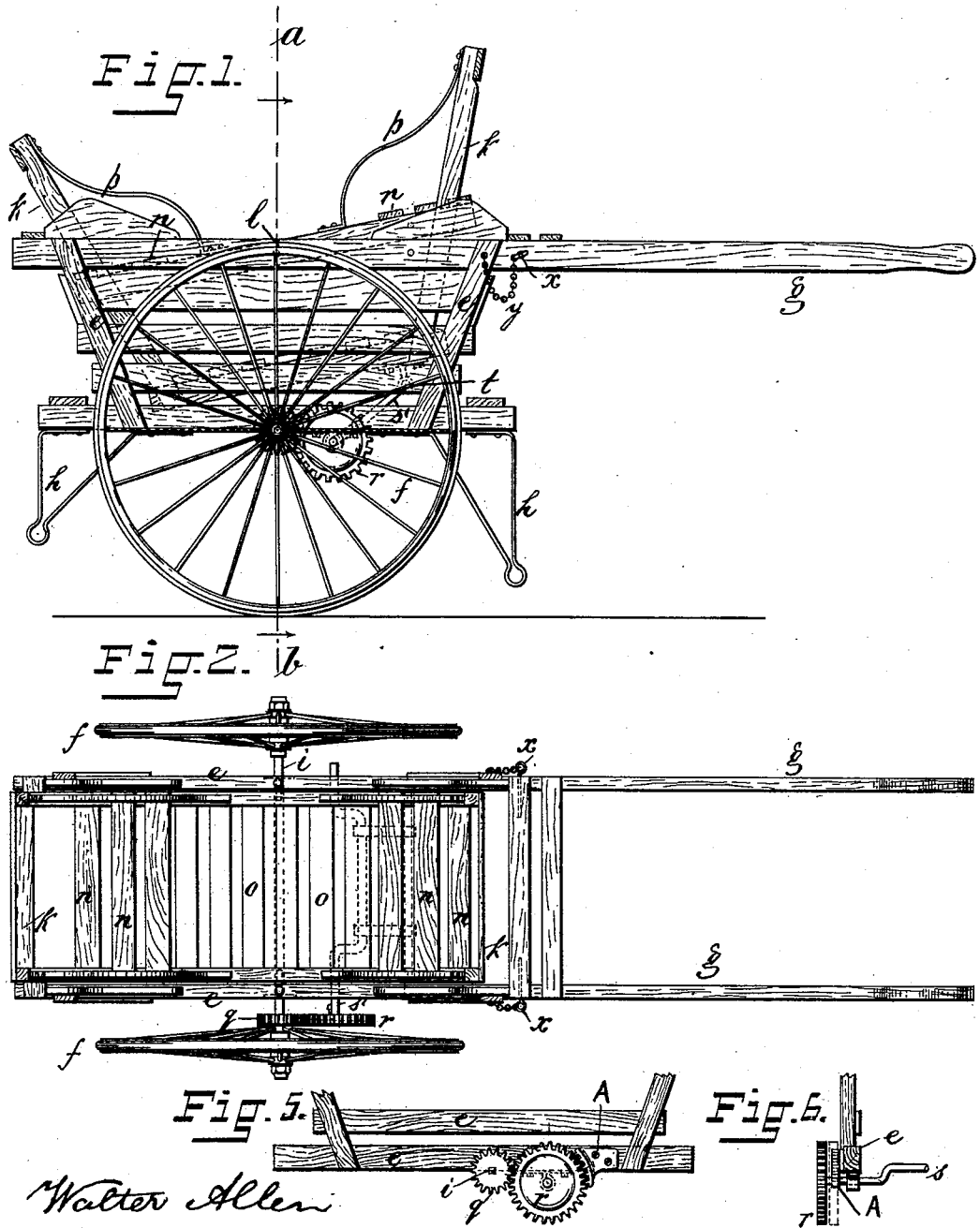

(No Model.) 2 Sheets—Sheet 2.

T. JOHNSON, A. HANSON & N. WHITELEY.
CHILD'S CARRIAGE.

No. 425,612. Patented Apr. 15, 1890.

Walter Allen
Geo. L. Wheelock
WITNESSES.

INVENTORS:
Thomas Johnson
Albert Hanson
and N. Whiteley.
by Herbert H. T. Jenner
Attorneys.

UNITED STATES PATENT OFFICE.

THOMAS JOHNSON, ALBERT HANSON, AND NATHAN WHITELEY, OF HUDDERSFIELD, COUNTY OF YORK, ENGLAND.

CHILD'S CARRIAGE.

SPECIFICATION forming part of Letters Patent No. 425,612, dated April 15, 1890.

Application filed October 19, 1889. Serial No. 327,520. (No model.)

*To all whom it may concern:*

Be it known that we, THOMAS JOHNSON, ALBERT HANSON, and NATHAN WHITELEY, all subjects of the Queen of Great Britain, and residents of Huddersfield, county of York, England, have invented certain new and useful Improvements in a New or Improved Combined Seesaw and Mail-Cart or Gig for Children, of which the following is a specification.

This invention has reference to a new or improved combined seesaw and mail-cart or gig for the use and amusement of children.

In order to carry out our invention, we employ two or more wheels of light construction mounted on a suitable axis, to which is attached frame-work, and one or more handles or shafts, by which the cart may be drawn along. Mounted centrally in suitable bearings or upon a pivot above the axle of the cart is a car of any desired length and width, each extremity of which is provided with seats wherein the children may be seated and made secure. For the purpose of imparting a rocking or reciprocatory up-and-down motion to the car we employ intermediate driving mechanism, so that when the cart or gig is drawn along a rocking or reciprocatory up-and-down or seesaw motion is imparted to the car, and the children seated at each end are both ridden and enjoy the motion of a seesaw at the same time. Whenever desired, the means for imparting the rocking or reciprocatory up-and-down motion may be disconnected from the car and the latter supported in a horizontal position by suitable stay-rods or supports connected with the body of the cart, which then forms an ordinary go-cart.

In order that our invention may be better understood, we will now make reference to the accompanying sheet of drawings, wherein—

Figure 3:
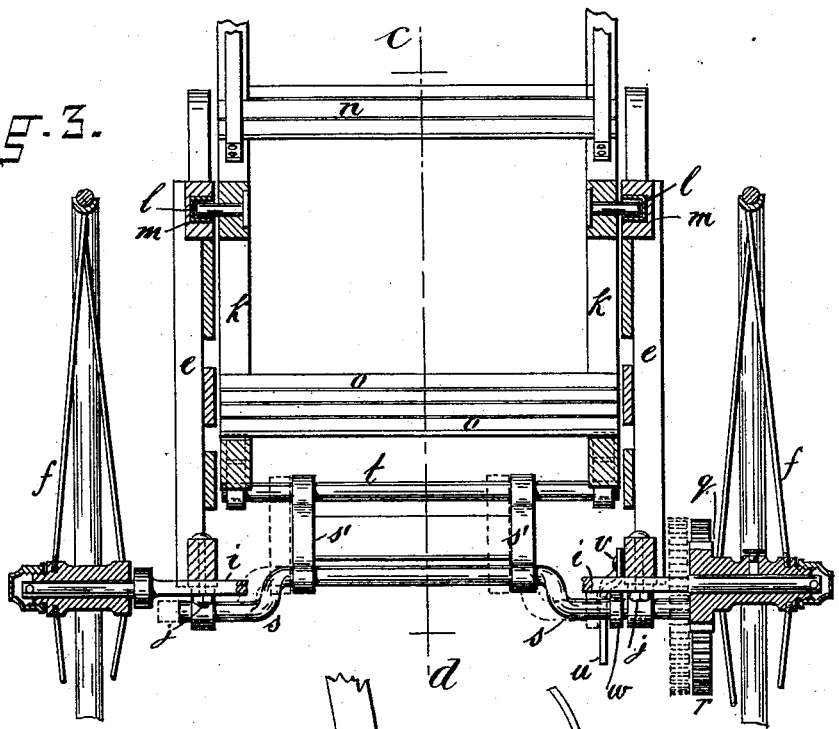
Figure 4:
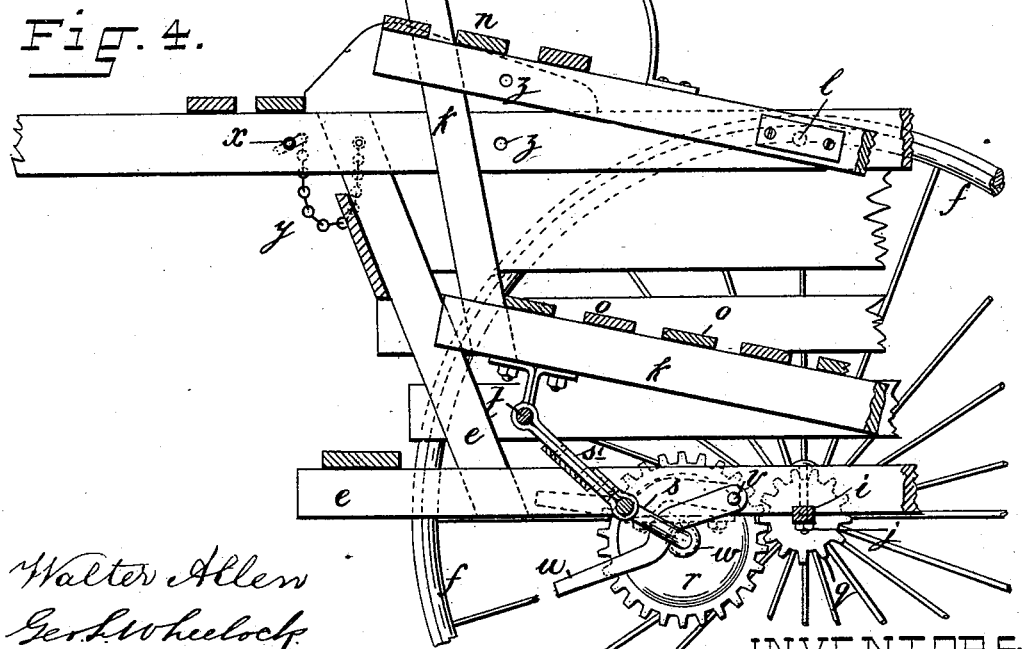

Figure 1 is an elevation of our improved mail-cart, seesaw, or gig; and Fig. 2 is a plan view of same. Fig. 3 is an enlarged section through the line $a\ b$ of Fig. 1, and Fig. 4 is a section through the line $c\ d$ of Fig. 3. Figs. 5 and 6 are, respectively, a detail, side, and end view of a modification of the mechanism for preventing the car from rocking.

Letter $e$ represents a carriage mounted upon wheels $f$, provided with handles or shafts $g$, and also with legs or feet $h$. The wheels $f$ revolve loosely on each end of the horizontal bar or shaft $i$, made secure to the under side of the carriage $e$ by bolts and set-screws $j$. Within the said carriage $e$ is a car $k$, supported on pivots $l$ at each side of the said car, and working in fixed sockets $m$, made secure in the frame-work of the carriage $e$. The car $k$ is provided with two seats $n$, placed opposite each other, and also with foot-boards $o$, as will be well understood. The car is provided with stays or rods $p$, which prevent the children from falling out sidewise, while the said stays also assist in strengthening the car. This car is made to rock or oscillate upon its pivots $l$, the movement necessary for giving the rocking motion being obtained in the following manner: The metal nave or hub of one of the wheels $f$ has cast with it a pinion-wheel $q$, which drives a spur-wheel $r$, in gear with the said pinion. The axle $s$ of the spur-wheel $r$ is cranked, as shown in Figs. 3 and 4, such cranked shaft being connected by links $s'$ to a rod $t$, attached to brackets underneath the car $k$. It is therefore obvious that when the carriage $e$ is made to travel in either direction the crank will give to the car $k$ a rocking or oscillating motion, so that children while being carried along in the car will also receive an up-and-down or rocking motion. It is also obvious that instead of the car being made to rock by a crank and link, as herein shown and described, the same motion may be obtained by equivalent mechanism—such as an eccentric or cam. The spur-wheel $r$, in gear with the pinion $q$, is kept in the position shown in the drawings of Fig. 3, by means of a lever-arm $u$, connected by pin $v$ to the inner side of the carriage $e$, such lever-arm resting upon the cranked shaft $s$ and close up to a collar $w$ on the said shaft, so that endwise or lateral movement of the spur-wheel $r$ is prevented. If, however, the rocking motion of the car is not required, the lever-arm $u$ is raised into the position shown in dotted lines of Fig. 4, whereby the cranked shaft $s$, with the spur-wheel upon it, can be drawn endwise, so as to place the spur-wheel $r$ out of gear with the driven pinion $q$, as shown in dotted lines, Fig. 3, in which case the crank would cease to be operated; but in order to make the car stationary and fix it in a horizontal position when not rocking I employ rods or pegs $x$, connected to the chain $y$, which can be inserted into holes $z$, formed in both the carriage and go-cart.

A modification of the means for stopping the rocking motion of the seesaw is shown at Figs. 5 and 6, and consists of bracket A, secured to the body of the carriage $e$, one portion of the said bracket forming a toothed segment. It must be understood that the bracket A is not lineable with the toothed wheel $i$, so that when the toothed wheel $r$ is in gear with wheel $i$ it is out of gear with the segment A, and vice versa; when in gear with the bracket A it is out of gear with pinion-wheel $i$. Therefore when it is necessary for the car $k$ to rock, the wheel $r$ is placed into gear with wheel $i$; but when it is necessary to stop the rocking motion of the said car the shaft $s$ is pushed endwise, as already described, so as to remove wheel $r$ out of gear with wheel $i$ into gear with the segment A. Consequently the motion of wheel $r$ is stopped and the see-saw made stationary.

We claim as our invention—

1. The combination, with a vehicle mounted centrally upon a single pair of wheels, of a car pivoted in the frame-work of said vehicle over the center of the axle, and intermediate driving mechanism operatively connected to one of the said wheels for imparting a rocking motion to the car in addition to the rocking motion of the vehicle upon its axle, substantially as set forth.

2. The combination, with a vehicle mounted centrally upon a single pair of wheels, of a car pivoted in the frame-work of said vehicle, a crank-shaft journaled under said vehicle, toothed wheels connecting the crank-shaft with one of the said wheels, and a link connecting the crank-shaft with the car, whereby said car may be rocked, substantially as set forth.

3. The combination, with a vehicle mounted centrally upon a single pair of wheels, of a car pivoted in the frame-work of said vehicle, a sliding crank-shaft journaled under said vehicle, toothed wheels connecting the crank-shaft with one of the vehicle-wheels, a pivoted lever normally preventing the crank-shaft from sliding and keeping said toothed wheels in gear, and a link connecting the crank-shaft with the car, whereby said car may be rocked, substantially as set forth.

4. The combination, with a vehicle mounted centrally upon a single pair of wheels, of a rocking car pivoted in the frame-work of said vehicle, a sliding crank-shaft journaled under said vehicle, toothed wheels connecting the crank-shaft with one of the vehicle-wheels, and a stationary stop for the sliding toothed wheel on said crank-shaft to engage with when disconnected from the vehicle-wheel, thereby preventing the said car from rocking independently of the vehicle-frame when not required to do so, substantially as set forth.

5. The combination, with a vehicle mounted upon wheels, of a car pivoted centrally at its top edge to the top of the vehicle-frame and provided with seats at each end and footboards under and between the seats, and intermediate driving mechanism operatively connected to one of the vehicle-wheels for rocking the car, substantially as and for the purpose set forth.

In witness whereof we have hereunto signed our names in the presence of two subscribing witnesses.

THOMAS JOHNSON.
ALBERT HANSON.
NATHAN WHITELEY.

Witnesses:
C. W. WHITMAN,
*U. S. Consular Agent at Huddersfield.*
THOMAS H. BARRON,
*Clerk to Messrs. Tasker & Crossley, Market Place, Huddersfield.*